(12) United States Patent
He

(10) Patent No.: US 11,576,146 B1
(45) Date of Patent: Feb. 7, 2023

(54) CONFIGURATION AND PROCEDURE FOR PDCCH-BASED PAGING EARLY INDICATION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/649,962

(22) Filed: Feb. 4, 2022

Related U.S. Application Data

(60) Provisional application No. 63/252,121, filed on Oct. 4, 2021.

(51) Int. Cl.
*H04W 68/00* (2009.01)
*H04W 56/00* (2009.01)
*H04W 24/08* (2009.01)

(52) U.S. Cl.
CPC ......... *H04W 68/005* (2013.01); *H04W 24/08* (2013.01); *H04W 56/001* (2013.01)

(58) Field of Classification Search
CPC ............... H04W 68/005; H04W 24/08; H04W 56/001; H04W 68/02; H04W 68/06; H04W 68/08
See application file for complete search history.

(56) References Cited

U.S. PATENT DOCUMENTS

| 2020/0053791 A1* | 2/2020 | Ozturk | H04W 74/0833 |
| 2022/0046582 A1* | 2/2022 | Shrivastava | H04B 7/00 |
| 2022/0046585 A1* | 2/2022 | Wu | H04W 68/02 |

FOREIGN PATENT DOCUMENTS

CN        113163476 A    *  7/2021

* cited by examiner

*Primary Examiner* — Said M Elnoubi
(74) *Attorney, Agent, or Firm* — Patterson & Sheridan, L.L.P.

(57) ABSTRACT

Certain aspects of the present disclosure provide techniques for paging early indication (PEI) configuration and monitoring procedures. In particular, the present disclosure provides techniques for configuring a user equipment (UE) for PEI monitoring. A method that may be performed by a network entity generally includes transmitting, to the UE, a configuration for paging early indication (PEI) occasions for the UE to monitor and transmitting, in at least one of the PEI occasions, a physical downlink control channel (PDCCH) with a PEI that indicates, for multiple paging occasions (POs), whether paging messages are scheduled for the UE in the multiple POs.

28 Claims, 10 Drawing Sheets

CONFIGURATION AND PROCEDURE FOR PDCCH-BASED PAGING EARLY INDICATION

CROSS-REFERENCE TO RELATED APPLICATION(S)

This application claims priority to U.S. Provisional Application No. 63/252,121 filed Oct. 4, 2021, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for paging early indication (PEI) configurations and procedures.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include spectral efficiencies in configuring resources for cross-link interference measurements.

Certain aspects of the subject matter described in this disclosure can be implemented in a method for wireless communications by a network entity. The method generally includes transmitting, to a user equipment (UE), a configuration for paging early indication (PEI) occasions for the UE to monitor and transmitting, in at least one of the PEI occasions, a physical downlink control channel (PDCCH) with a PEI that indicates, for multiple paging occasions (POs), whether paging messages are scheduled for the UE in the multiple POs.

Certain aspects of the subject matter described in this disclosure can be implemented in a method for wireless communications by a UE. The method generally includes detecting, in a PEI occasion, a PDCCH from a network entity with a PEI that indicates, for multiple POs, whether messages are scheduled for the UE in the multiple POs, and monitoring the one or more of the multiple POs for the message based on the indication in the PEI.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for paging early indication (PEI) configuration and monitoring procedures.

A user equipment (UE) may save battery power by entering an idle or inactive mode while monitoring paging information (e.g., at sparse occasions), such as a physical downlink control channel (PDCCH), from the network to receive system information block (SIB) updates, earthquake and tsunami warning system (ETWS) messages, and/or various other messages when the UE is paged.

To allow the UE to stay in a low power state longer, a PEI may be used. A PEI generally refers to a signal or message that is used as a preceding notice before the transmission of actual paging messages in corresponding paging occasions (POs). By monitoring PEIs, the UE may only monitor subsequent POs for paging if an associated PEI indicates paging for the UE in those POs.

Certain aspects of the present disclosure propose using a PEI conveyed in a PDCCH. A potential advantage of such a PDCCH-based PEI is that it may convey more information than a sequence-based PEI. For example, a PDCCH-based PEI may be able to provide an indication for multiple POs. This aggregation of information may help reduce the signaling load on a paging channel. A PEI configuration may indicate what type of information is conveyed in a PDCCH-based PEI, such as the number of POs indicated by the PEI and a number of copies of PEIs transmitted (e.g., to increase the likelihood of a PEI being successfully received).

Thus, the PEI configuration and monitoring procedures described herein may provide a signaling-efficient mechanism that enables the UE to take advantage of paging mechanisms that save energy.

Introduction to Wireless Communication Networks

Figure 1:
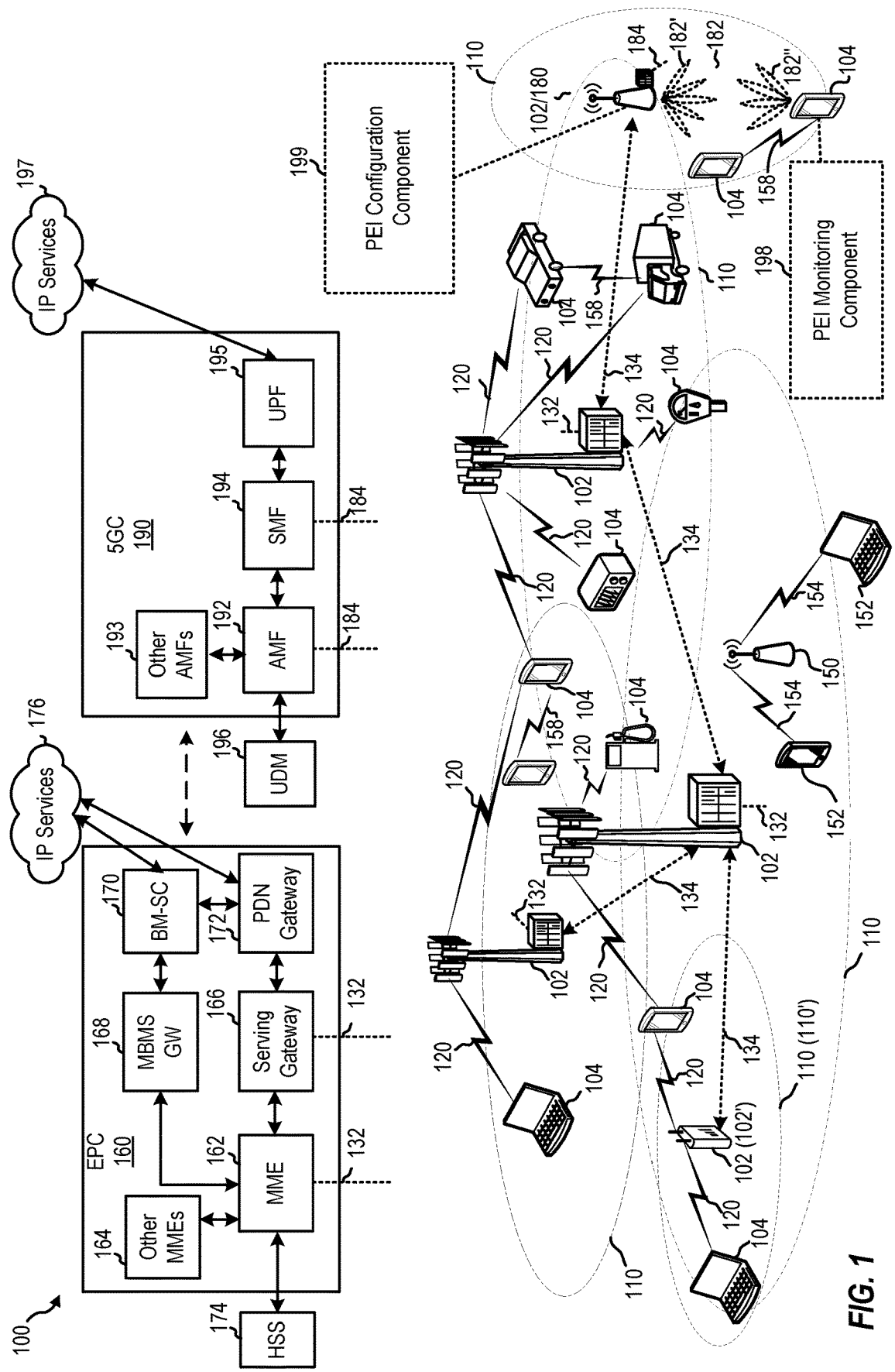
FIG. 1 is a block diagram conceptually illustrating an example wireless communication network, in accordance with certain aspects of the present disclosure.

FIG. 1 depicts an example of a wireless communications system 100, in which aspects described herein may be implemented. Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services. According to aspects the present disclosure, the UEs 104 in wireless communications system 100 may include two or more different types of UEs, where the two or more different types of UEs include at least one reduced capability (Red-Cap) UE (e.g., a device implemented with reduced capabilities which may exhibit a general relaxation of peak throughput, as well as lower latency and/or reliability requirements) and at least one non-RedCap UE (e.g., a regular UE). In some cases, the BS 102 may transmit one or more joint configurations or joint signaling to the two or more different types of UEs 104.

BSs 102 may provide an access point (AP) to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an AP, a base transceiver station, a radio BS, a radio transceiver, or a transceiver function, or a transmission reception point (TRP) in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs 102 (e.g., BS 180 in FIG. 1) may utilize beamforming 182 with a UE 104 to improve path loss and range. For example, BS 180 and UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from BS 180 in one or more receive directions 182". UE 104 may also transmit a beamformed signal to BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications system 100 includes a Paging Early Indication (PEI) Configuration Component 199, which may be configured to transmit, to a UE 104, a configuration for PEI occasions for the UE to monitor and transmit, in at least one of the PEI occasions, a physical downlink control channel (PDCCH) PEI to the UE. Wireless communications system 100 further includes a PEI Monitoring Component 198, which may be configured to monitor for PEI transmissions based on a PEI configuration.

Figure 2:
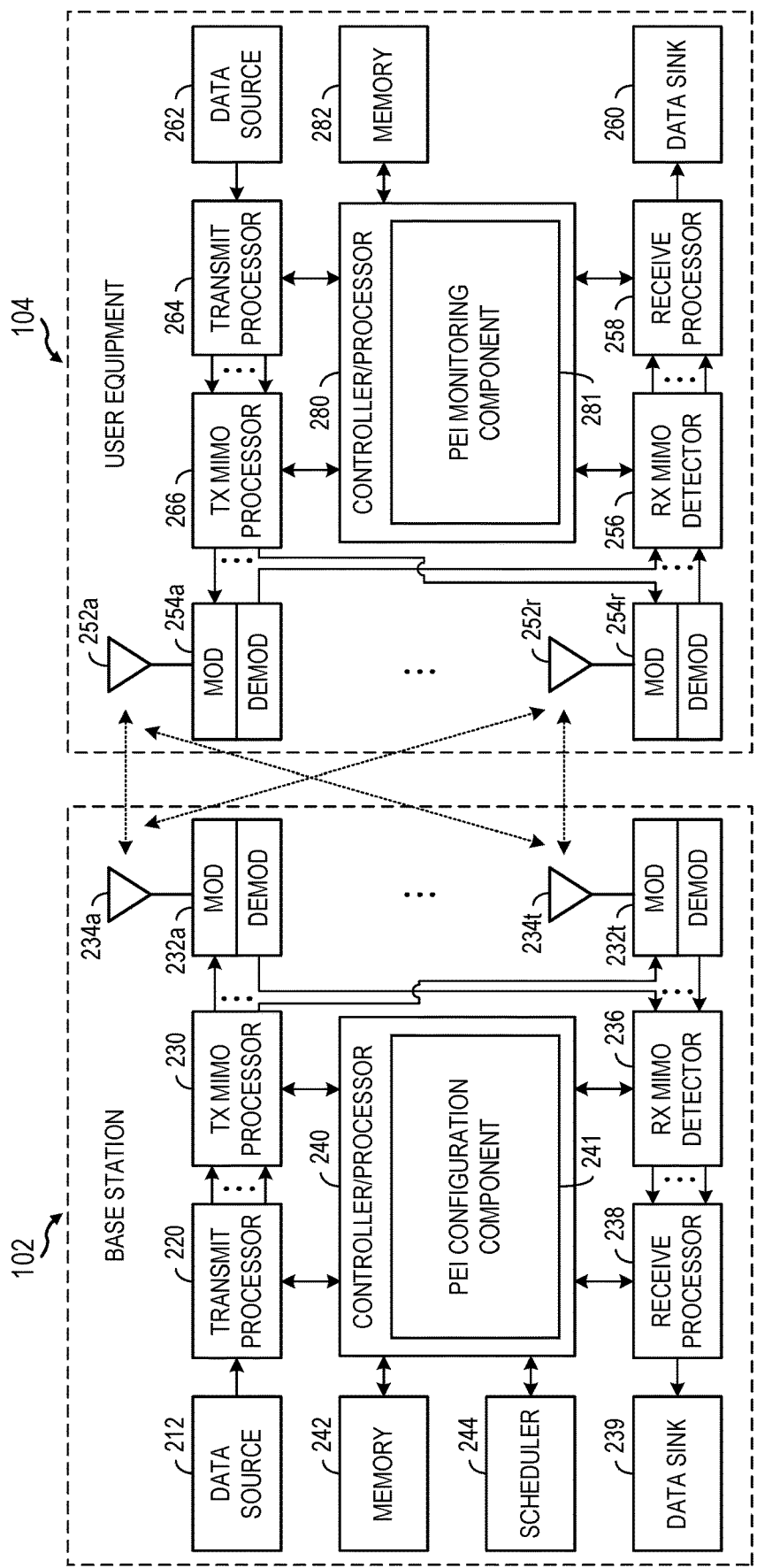
FIG. 2 is a block diagram conceptually illustrating aspects of an example of a base station (BS) and user equipment (UE), in accordance with certain aspects of the present disclosure.

FIG. 2 depicts aspects of an example of a BS 102 and a UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes PEI Configuration Component 241, which may be representative of PEI Configuration Component 199 of FIG. 1. Notably, while depicted as an aspect of controller/processor 240, PEI Configuration Component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes PEI Monitoring Component 281, which may be representative of PEI Monitoring Component 198 of FIG. 1. Notably, while depicted as an aspect of controller/processor 280, PEI Monitoring Component 281 may be implemented additionally or alternatively in various other aspects of UE 104 in other implementations.

Figure 3:
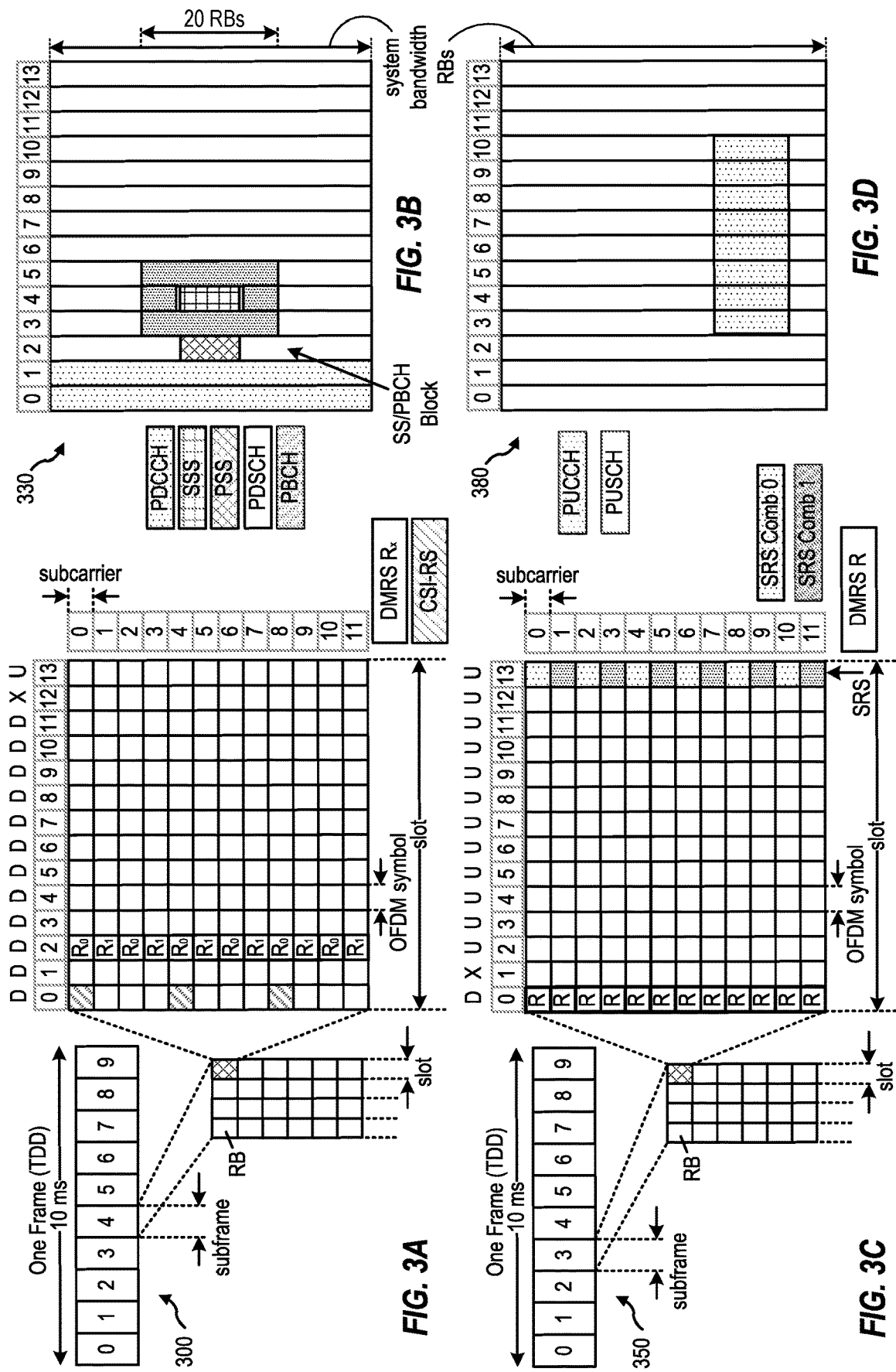
FIGS. 3A-3D depict various example aspects of data structures for a wireless communication network, in accordance with certain aspects of the present disclosure.

FIGS. 3A-3D depict aspects of data structures for a wireless communication network, such as wireless communications system 100 of FIG. 1, in accordance with certain aspects of the present disclosure. In particular, FIG. 3A is a diagram 300 illustrating an example of a first subframe within a 5G (e.g., 5G New Radio (NR)) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Millimeter Wave (mmWave) Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3$^{rd}$ Generation Partnership Project (3GPP) standards. For example, two initial operating bands have been identified as frequency range designations Frequency Range 1 (FR1) (410 megahertz (MHz)-7.125 gigahertz (GHz)) and Frequency Range 2 (FR2) (24.25 GHz-52.6 GHz). The frequencies between FR1 and FR2 are often referred to as mid-band frequencies.

Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter (mm) and 10 mms. Radio waves in the band may be referred to as a millimeter wave. Near mmWaves may extend down to a frequency of 3 GHz with a wavelength of 100 millimeters. The super high frequency (SHF) band extends between 3 GHz and 30 GHz, and may also be referred to as a centimeter wave.

With the above aspects in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave BS 180 may utilize beamforming 182 with UE 104 to improve path loss and range. To do so, BS 180 and UE 104 may each include a plurality of antennas, such as antenna elements, antenna panels, and/or antenna arrays to facilitate the beamforming. Therefore, multiple TRPs (multi-TRPs) or communications via multiple radio access links using the plurality of antennas or panels may be used to counteract path loss or otherwise to improve channel reliability.

In some cases, BS 180 may transmit a beamformed signal to UE 104 in one or more transmit directions 182'. UE 104 may receive the beamformed signal from BS 180 in one or more receive directions 182". UE 104 may also transmit a beamformed signal to BS 180 in one or more transmit directions 182". BS 180 may receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Further, as described herein, UEs of mmW communications may benefit from improved power management and low signaling overhead. Joint paging configuration according to the present disclosure may apply to different types of UEs to save signaling overhead, as described in details below.

Overview of Paging Early Indications (PEIs)

Paging configuration and monitoring for NR inherited features from the LTE paging channel design, with various elements. For example, NR uses the concept of a user equipment (UE) periodicity (T) for monitoring paging. UE derives its value for T based on a cell's default paging cycle, its own UE-specific discontinuous reception (DRX) cycle or extended DRX (eDRX) configuration. Typical values of T are 640 ms, 1280 ms, 2560 ms, and 5120 ms. T is also referred to herein as the paging cycle.

NR also utilizes the concept of a Paging Frame (PF), which generally refers to a radio frame that contains one or more paging occasions (PO). The network typically configures a number of PFs per paging cycle, as well as a start offset for the start location of a PF within one paging cycle. Based on the configuration, a radio frame may be considered a PF if it satisfies the following equation:

$$(SFN+PF\_offset) \bmod T=(T \text{ div } N)*(UE\_ID \bmod N);$$

where SFN is the system frame number of the radio frame, PF_offset is the start offset for the PF, and UE_ID is the UE's ID, for example a Temporary Mobile Subscriber Identity (TMSI) assigned by a core network (CN). Within a PF, there may be one or more POs.

A PO generally refers to a set of physical downlink control channel (PDCCH) monitoring occasions where a paging indication for a UE is sent. A PO may consist of multiple time slots. Each UE may be assigned to one PO for each paging cycle. Within each PF, UEs may be randomly assigned to a PO by hashing their UE_ID, for example, according to the following equation:

$$i\_s=\text{floor } (UE\_ID/N) \bmod Ns;$$

where i_s is the index of a PO within a PF and Ns is a number of POs within a PF. Paging messages for UEs sharing the same PO are typically multiplexed in a single physical downlink shared channel (PDSCH).

Example Physical Downlink Control Channel (PDCCH)-Based Paging Early Indication (PEI) Configuration and Monitoring Procedures Aspects of the present disclosure provide procedures for configuring and monitoring for physical downlink control channel (PDCCH)-based paging early indications (PEIs). In such cases, a PDCCH-based PEI generally refers to a PDCCH message sent before a user equipment's (UE's) paging occasion (PO), in order to notify that UE of a new page or short message.

Figure 4:
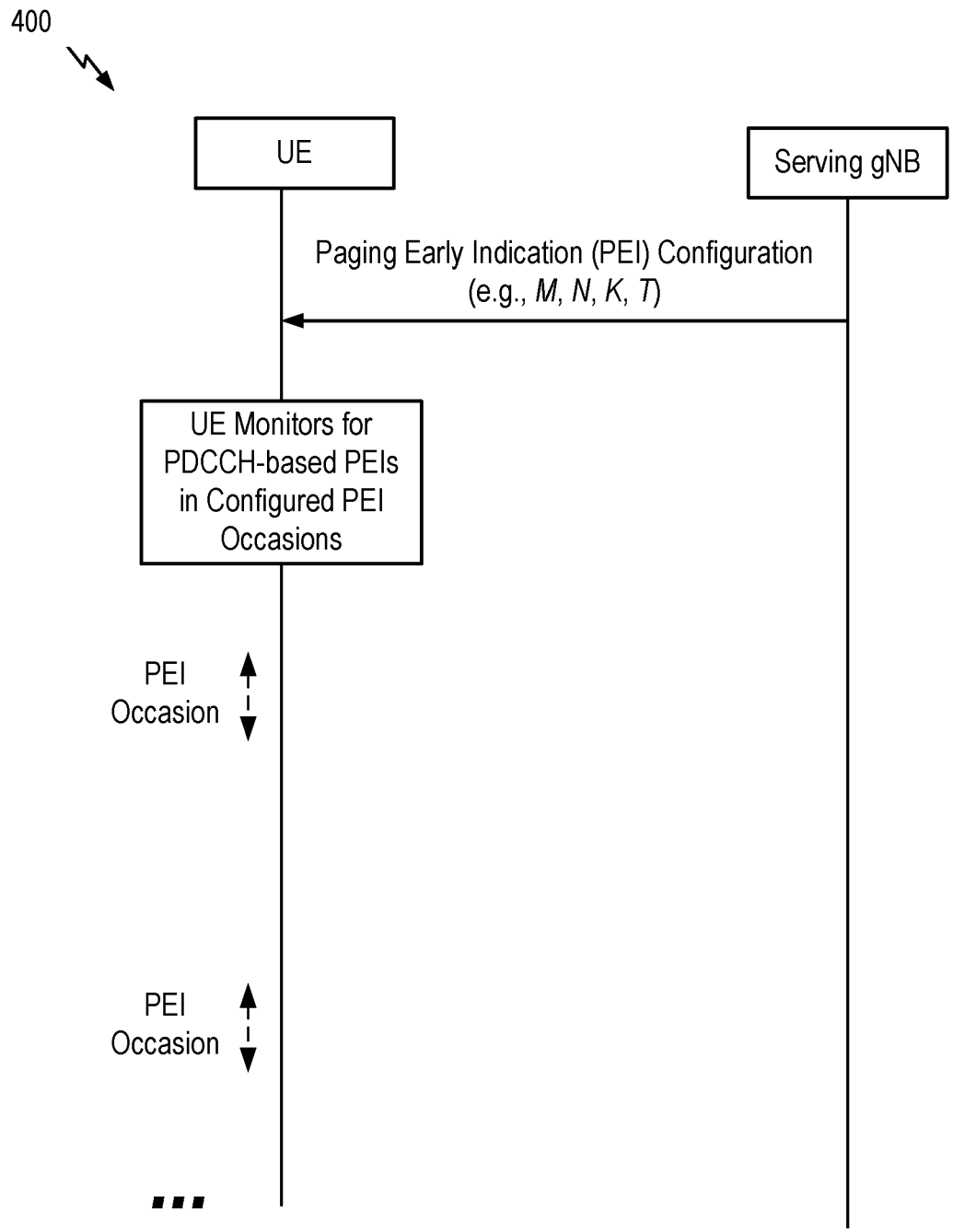
FIG. 4 depicts a call flow diagram for paging early indication (PEI) configuration, in accordance with certain aspects of the present disclosure.

FIG. 4 depicts an example call flow diagram 400 illustrating example signaling for a PEI configuration procedure, in accordance with certain aspects of the present disclosure.

As illustrated in FIG. 4, a network entity (e.g., a serving base station (BS)/gNB) may configure a UE with a PEI configuration (e.g., a configuration for PEI occasions for the UE to monitor). The configuration may indicate a number of parameters (e.g., one or more of M, N, K, and T) described in greater detail below. In some cases, one or more of the parameters M, N, K, T configured by the gNB may vary across cells. Varying the parameters across cells may help to provide some flexibility (e.g., based on a number of UEs served in a given cell at any given time).

Once configured, the UE may monitor for PDCCH-based PEIs in the configured PEI occasions. If the UE does not detect a PEI, the UE may remain (or return to) a low power state, with some assurance that the UE will not miss a paging message in an upcoming PO.

Figure 5:
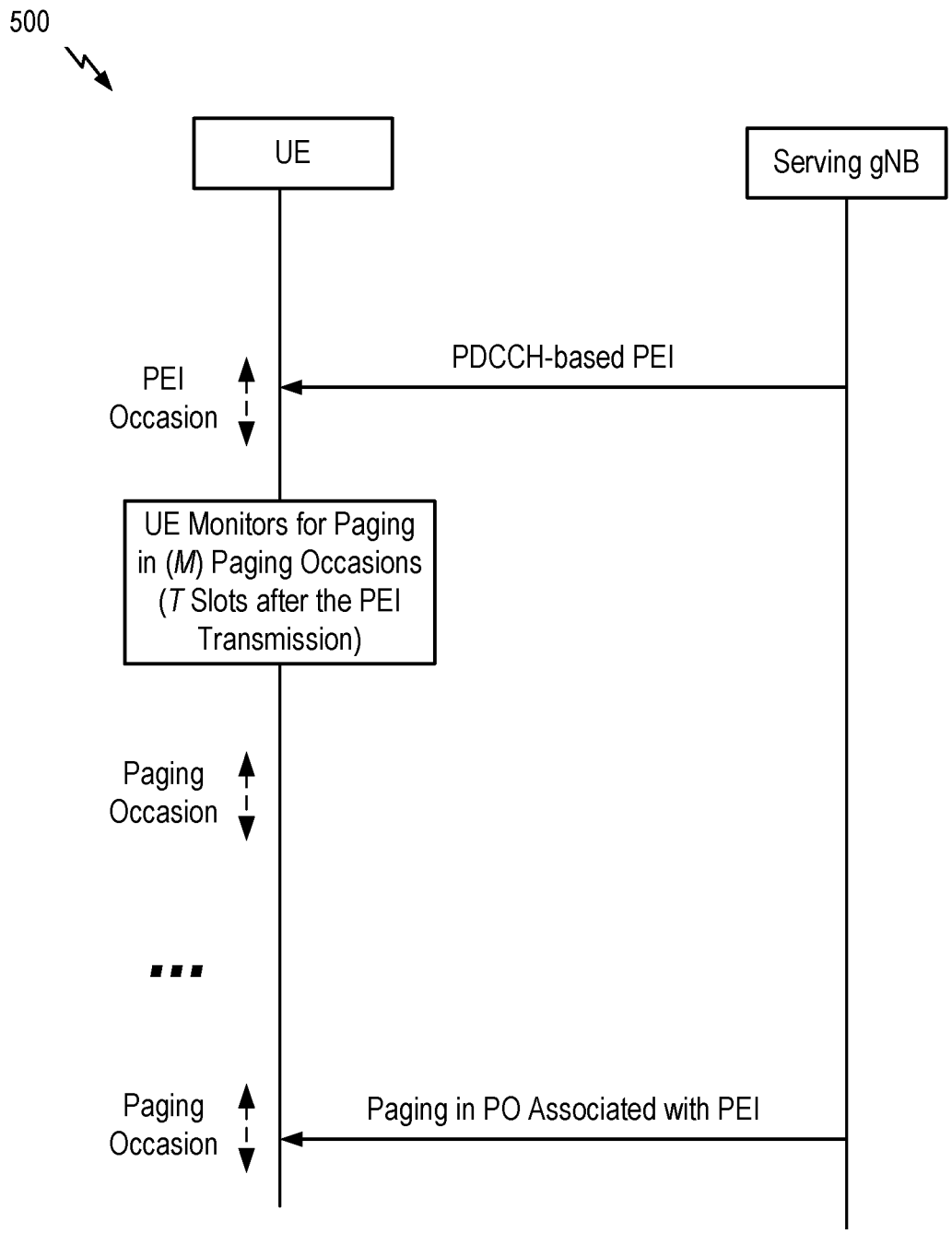
FIG. 5 depicts a call flow diagram for a PEI monitoring procedure, in accordance with certain aspects of the present disclosure.

FIG. 5 depicts an example call flow diagram 500 illustrating example signaling for a PEI monitoring procedure, in accordance with certain aspects of the present disclosure.

As illustrated in FIG. 5, a network entity (e.g., serving BS/gNB) may transmit a PDCCH-based PEI, in one of the configured PEI occasions (e.g., configured by the serving gNB in FIG. 4), to indicate a paging (or short data) message for the UE in an upcoming PO. Based on the PEI, the UE may begin to monitor POs associated with the PEI for paging messages.

Figure 6:
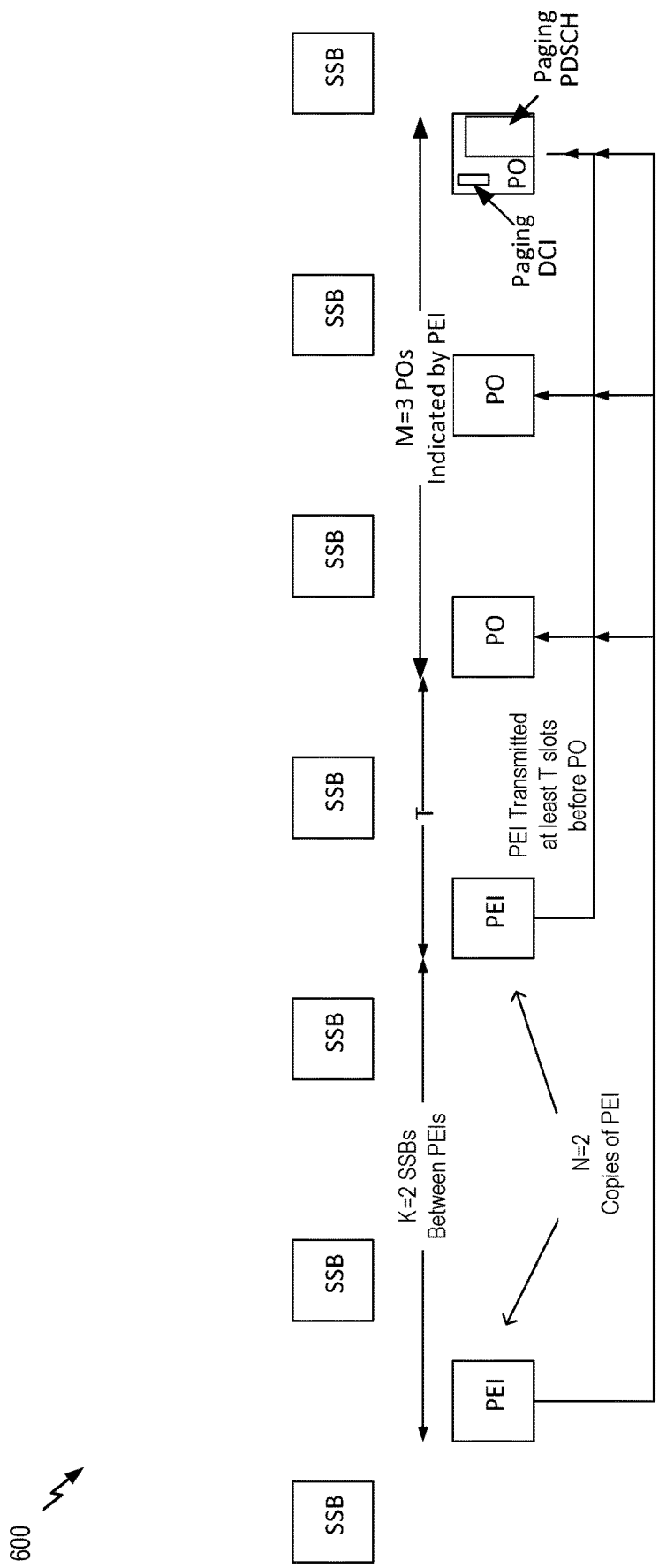
FIG. 6 depicts an example timeline for paging early PEI occasions and paging occasions (POs), in accordance with certain aspects of the present disclosure.

In some cases, each PEI occasion may provide an indication of whether or not there is paging for the UE in M (one or more) POs, where the value of M may be indicated in the PEI configuration. Parameter M may be an integer greater than or equal to one. The example timing diagram 600 of FIG. 6 illustrates how a single PEI may provide paging indications for 3 (M=3) POs.

According to certain aspects, a PEI may be sent in a paging search space. In some cases, like a legacy paging downlink control information (DCI), a PEI may be sent in multiple cells in order to support mobile UEs.

One potential advantage to PDCCH-based PEIs is the ability to include more information than other types of PEIs, such as sequence-based PEIs. This ability may allow a single PEI to provide indications for multiple POs. This aggregation of information for multiple POs may help to reduce the signaling load/overhead on the paging channel.

According to certain aspects, for each PEI, the network may send multiple copies (e.g., N, where N≤M) copies. Parameter N may be an integer greater than or equal to one. In such cases, each PEI may be spaced apart in time by K synchronization signal blocks (SSBs) apart in time. Parameter K may be an integer greater than or equal to one. In the example illustrated in FIG. 6, 2 copies of a PEI are sent (e.g., N=2) where the 2 copies are spaced apart by 2 SSBs (K=2).

Configuring non-zero values for one or both of N and K may be beneficial because, depending on the UE's link quality or capability, the UE may need to acquire multiple SSBs before it can reliability decode a paging PDSCH. Because the network may not have sufficient knowledge of the link qualities of each UE in a PO, since the UEs are in a radio resource control (RRC) IDLE state, it may be useful to provide multiple opportunities for UEs with different capabilities and link quality to get its PEI.

According to certain aspects, each PEI may be transmitted at least T slots before its associated PO. Parameter T may be an integer greater than or equal to one. This gap in time may help the UE (e.g., to save power) by allowing the UE to use only a dedicated (e.g., low complexity/low power) portion of its radio frequency (RF) transceiver circuit to receive PEI(s). In such cases, the UE may only wake up the remainder of its transceiver for subsequent paging reception, when a PEI is detected.

According to certain aspects, each PEI may start in a first PDCCH monitoring occasion in a paging search space, after an end of an SSB. This relationship may allow the UE and network to be in synch regarding when a PEI is to occur.

A UE in an RRC IDLE/INACTIVE state may only perform radio resource monitoring (RRM) measurement(s) on its serving cell's SSBs at least once within paging cycle. Similarly, a UE may monitor for PEI at least once per paging cycle after having acquired one or more SSBs. In other words, a UE may need to acquire at least one SSB to perform synchronization before it can receive a PEI. Therefore, a UE may save significant power by only needing to wake up once in each paging cycle to perform both RRM measurement(s) and PEI reception.

As noted above, if the UE does not detect a PEI in a PEI occasion, it may not (stay awake to) monitor the associated PO(s). In some cases, the network may configure what can be referred to as anchor cycles, in which the UE effectively ignores PEI and monitors for paging indications regardless (e.g., in periodically-occurring anchor POs configured by the network). Configuring anchor cycles may be beneficial because, in many scenarios, most paging cycles may be empty without a page. Configuring anchor cycles may help reduce signaling load on the paging channel. Anchor cycles may also help improve the reliability of paging reception because the UE monitors for paging indications even in the event it misses (e.g., is unable to detect) a PEI.

In some cases, a PEI for each paging subgroup may be supported by a cell. In some cases, if a subgroup is not included in a PEI, that subgroup may lose its benefit of reducing false paging alarm. A paging subgroup generally refers to a group of UEs that may share paging signaling resources. For example, UEs in a same subgroup may share a common paging indication using a paging DCI, or PEI (as proposed herein). In some cases, a UE subgroup may be indicated using one or a set of paging radio network temporary identifiers (P-RNTIs).

In some cases, a PEI itself may not schedule a paging PDSCH. In such cases, after receiving a PEI indicating a new paging message, the UE may proceed to decode a paging DCI in the associated PO. In some cases, so called legacy UEs (e.g., that do not support PEI monitoring) may share the same POs with UEs that do. Such UEs may still receive scheduling information in the paging DCI; thus, it may be redundant to include scheduling information in the PEI. Thus, the PEI itself not scheduling a paging PDSCH may give a UE the option to skip the PEI if the UE chooses to skip the PEI.

In some cases, a short message (e.g., a message that indicates that there is an update to system information or a public warning message) may be sent in a paging DCI. This may be for similar reasons described above, for example, that short message gives a UE an option to skip the PEI if the UE chooses to skip the PEI.

In some cases, a UE may monitor for PEI(s) in any cell where PEIs are supported, regardless of the UE's mobility history. In other words, the UE may monitor for a PEI in a cell even where the UE has not been to that cell and/or has not received a PEI configuration in that cell. In LTE, a PEI may be sent only in a cell where a last page was received. However, in NR UEs may be more mobile; thus, a different rule may be more beneficial.

As described herein, a PDCCH-based PEI configuration and monitoring procedures may provide a signaling-efficient mechanism that enables a UE to take advantage of paging mechanisms that save energy.

Example Operations

Figure 7:
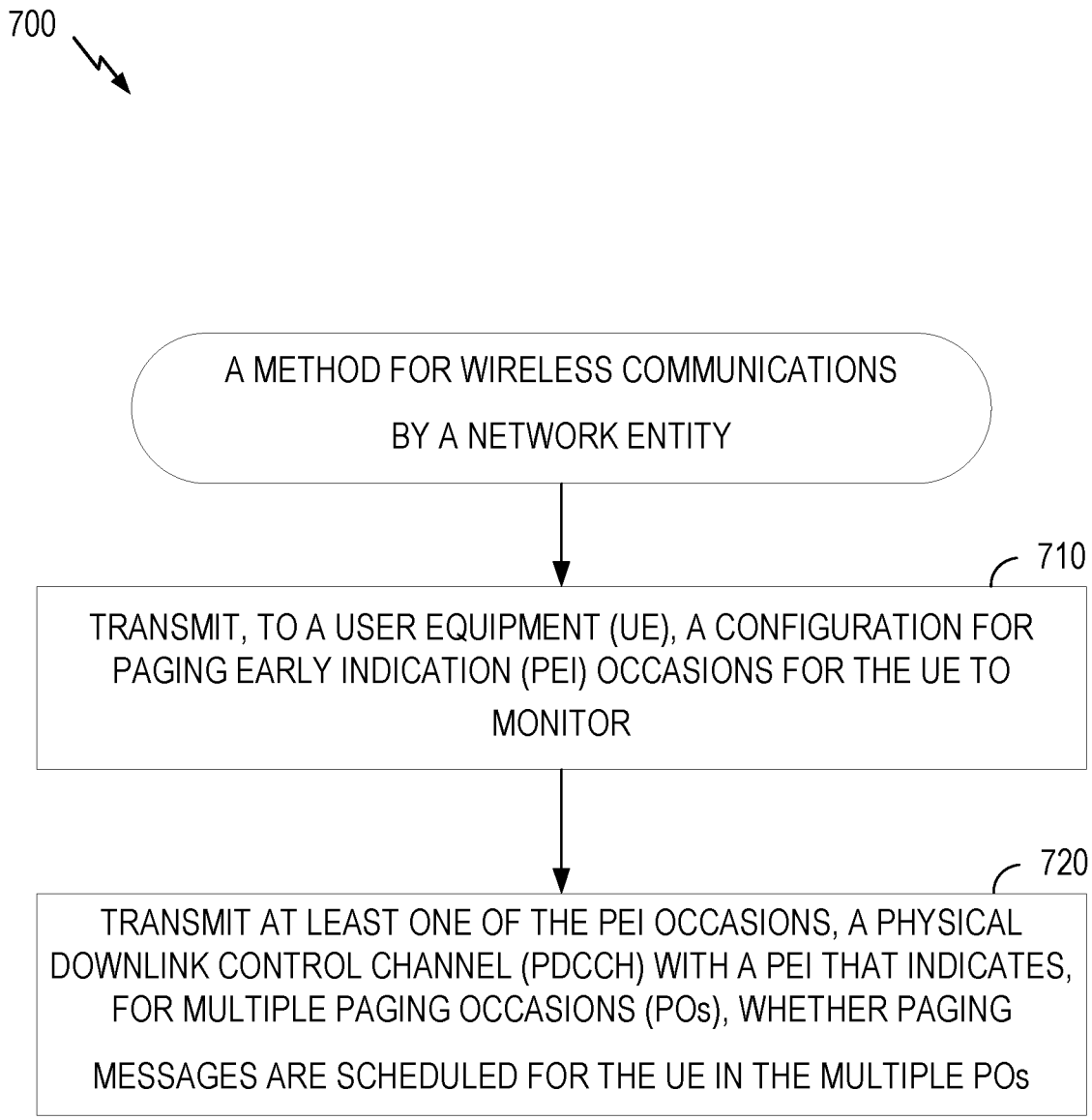
FIG. 7 is a flow diagram illustrating example operations for configuring PEI parameters by a network entity, in accordance with certain aspects of the present disclosure.

FIG. 7 is a flow diagram illustrating example operations 700 for configuring PEI parameters by a network entity, in accordance with certain aspects of the present disclosure. In some aspects, operations 700 may be performed by a base station (BS), such as BS 102 in FIGS. 1 and 2, or processing system 905 in FIG. 9.

Operations 700 may be implemented as software components that are executed and run on one or more processors (e.g., controller/processor 240 of FIG. 2). Further, the transmission and reception of signals by the network entity in operations 700 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network (RAN), such as a BS, a remote radio head or antenna panel in communication with a BS, and/or a network controller, for example.

At operation 710, the network entity transmits, to a user equipment (UE), a configuration for paging early indication (PEI) occasions for the UE to monitor. In some cases, the operations of this step refer to, or may be performed by, the circuitry 915 for transmitting as described below with reference to FIG. 9.

At operation 720, the network entity transmits, in at least one of the PEI occasions, a physical downlink control channel (PDCCH) with a PEI that indicates, for multiple paging occasions (POs), whether paging messages are scheduled for the UE in the multiple POs. In some cases, the operations of this step refer to, or may be performed by, circuitry 915 for transmitting as described below with reference to FIG. 9.

Figure 8:
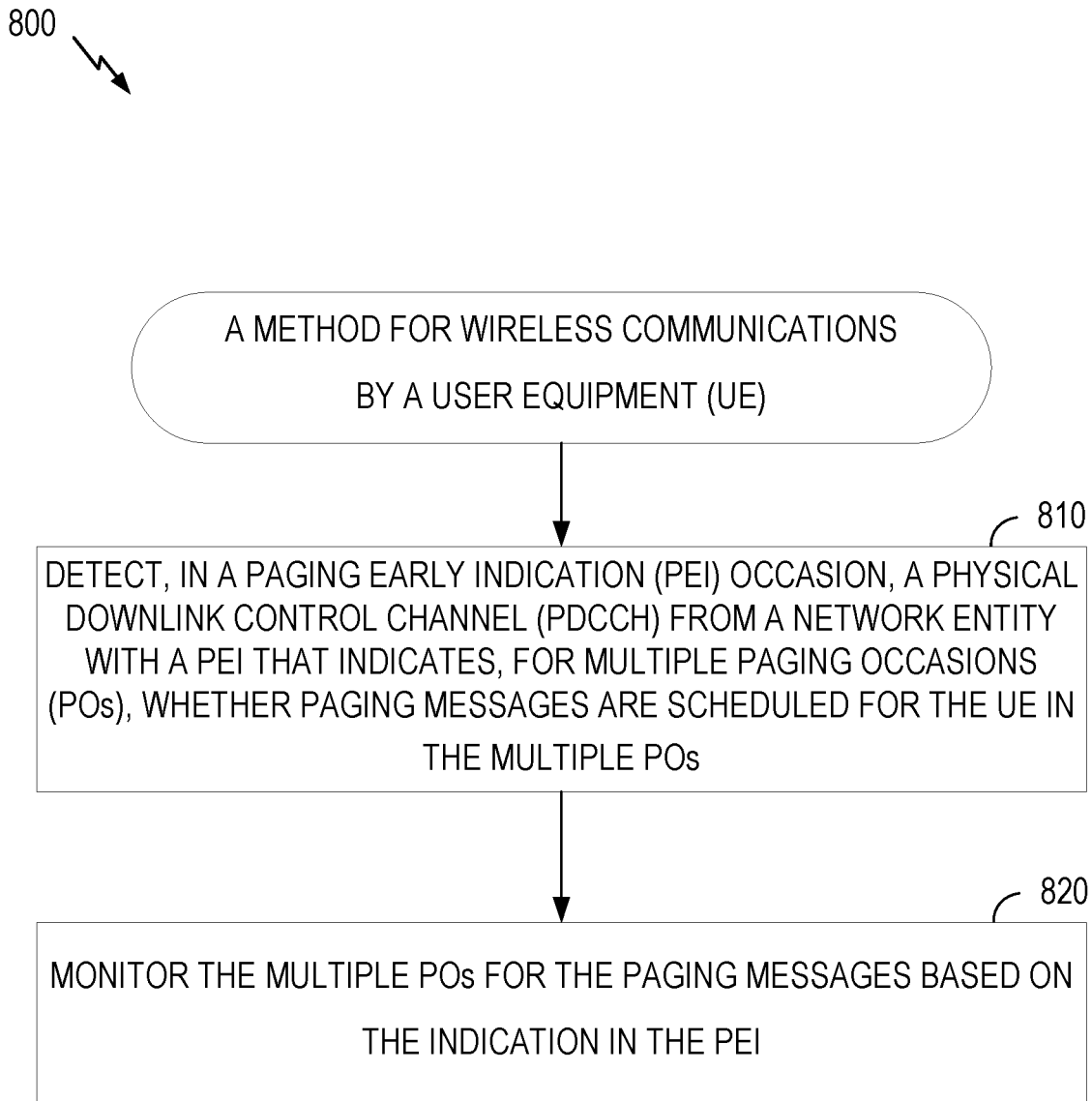
FIG. 8 is a flow diagram illustrating example operations for PEI monitoring by a UE, in accordance with certain aspects of the present disclosure.

FIG. 8 is a flow diagram illustrating example operations 800 for PEI monitoring by a UE, in accordance with certain aspects of the present disclosure. In some aspects, operations 800 may be performed by a UE, such as UE 104 in FIGS. 1 and 2, or processing system 1005 of FIG. 10. Operations 800 may be complementary to operations 700 performed by a network entity, as discussed above.

Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

At operation 810, the UE detects, in a PEI occasion, a PDCCH from a network entity with a PEI that indicates, for multiple POs, whether paging messages are scheduled for the UE in the multiple POs. In some cases, the operations of this step refer to, or may be performed by, the circuitry 1015 for detecting as described below with reference to FIG. 10.

At operation 820, the UE monitors the multiple POs for the paging messages based on the indication in the PEI. In some cases, the operations of this step refer to, or may be performed by, circuitry 1020 for receiving as described below with reference to FIG. 10.

In some aspects, the PDCCH with the PEI is transmitted in a same search space used for sending paging messages to the UE. In some cases, the PEI indicates, for multiple POs (e.g., per parameter M), whether messages are scheduled for the UE in those multiple POs.

In some cases, the network entity transmits multiple copies of the PEI (e.g., per parameter N) across multiple PEI occasions. The multiple copies of the PEI may be spaced apart in time by a period corresponding to a number of synchronization signal blocks (SSBs).

In some cases, the configuration indicates a number of slots corresponding to a minimum gap (e.g., parameter Tin slots) and each PEI may be transmitted at least the number of slots before a corresponding PO.

In some cases, each PEI starts in the first PDCCH monitor occasion in paging search space after end of an SSB. Each PEI occasion may occur in a PDCCH monitoring occasion after an end of a corresponding synchronization signal block (SSB).

In some cases, the configuration indicates at least one of: a first parameter that indicates a number of paging occasions (POs) for which a PEI indicates information; a second parameter that indicates a number of copies of a PEI the network entity transmits across multiple PEI; a third parameter indicating a number of synchronization signal blocks (SSBs) corresponding to a spacing between the copies of the PEI, or a fourth parameter that indicates a number of slots corresponding to a minimum gap between a PEI and a corresponding PO. In some cases, at least one of the first parameter, second parameter, third parameter, or fourth parameter varies across cells.

In some cases, the configuration indicates one or more anchor cycles corresponding to POs for the UE to monitor regardless of whether the UE receives PEIs prior to those POs.

In some cases, the PEI may notify UEs of multiple paging subgroups whether one or more upcoming POs have message for those UEs.

In some cases, the PEI lacks downlink control information (DCI) scheduling a paging physical downlink shared channel (PDSCH) and, in such cases, the network entity transmits a DCI scheduling the paging PDSCH in a corresponding PO.

In some cases, the PEI notifies the UE of a short message in the one or more upcoming POs. In some cases, the PEI is transmitted in multiple cells.

Example Wireless Communications Devices

Figure 9:
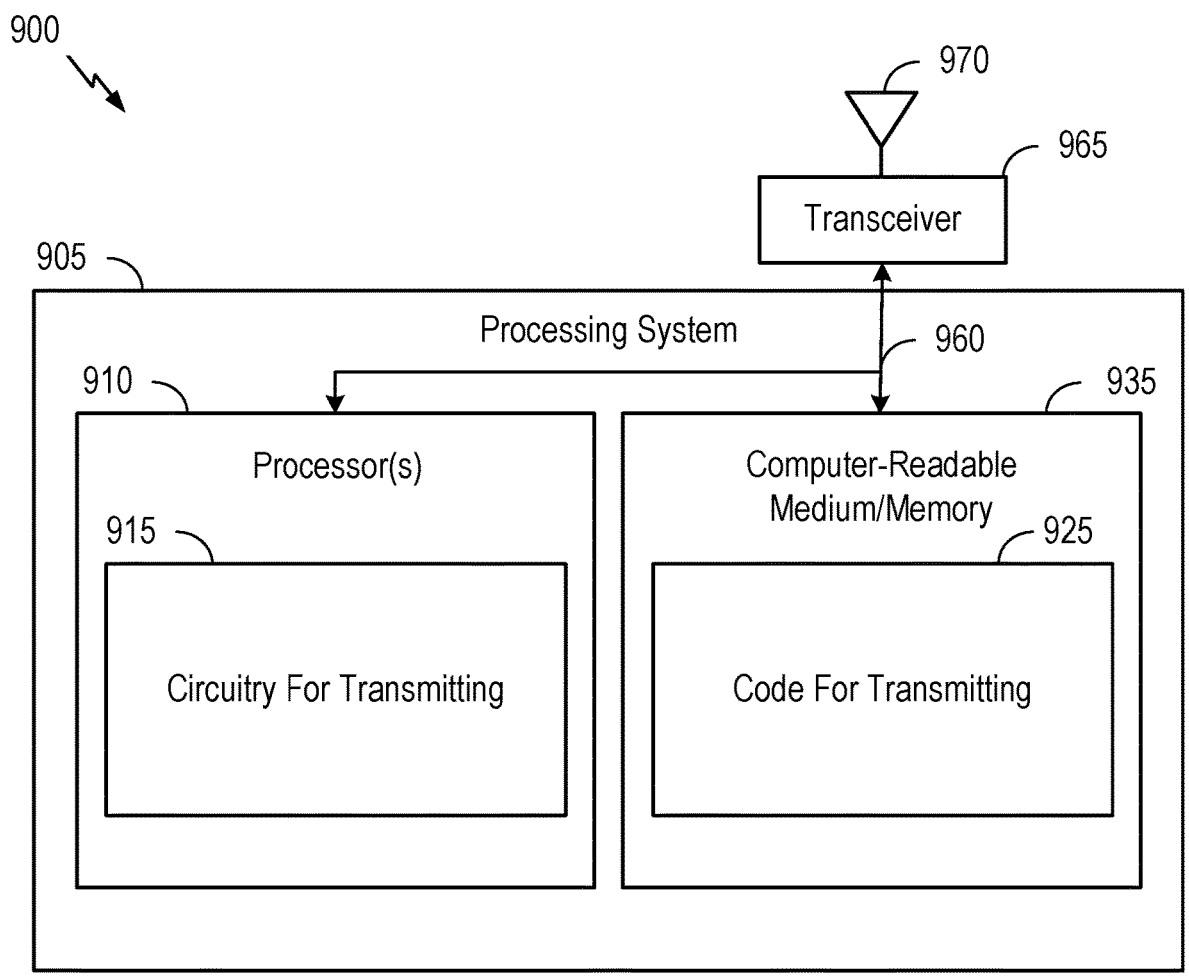
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) operable, configured, or adapted to perform operations for the techniques disclosed herein, such as operations 700 depicted and described with respect to FIG. 7. In some examples, communications device 900 may be a network entity, such as a base station (BS) (e.g., BS 102 as described, for example with respect to FIGS. 1 and 2).

Communications device 900 includes a processing system 905 coupled to a transceiver 965 (e.g., a transmitter and/or a receiver). Transceiver 965 is configured to transmit (or send) and receive signals for the communications device 900 via an antenna 970, such as the various signals as described herein. In some aspects, transceiver 965 is an example of, or includes aspects of, the corresponding elements described with reference to FIG. 7.

Processing system 905 may be configured to perform processing functions for communications device 900, including processing signals received and/or to be transmitted by communications device 900. In some aspects, the one or more processors 910 are examples of, or include aspects of, the corresponding elements described with reference to FIG. 7.

Processing system 905 includes one or more processors 910 coupled to a computer-readable medium/memory 935 via a bus 960. In certain aspects, computer-readable medium/memory 935 is configured to store instructions (e.g., computer-executable code) that when executed by the one or more processors 910, cause one or more processors 910 to perform the operations illustrated in FIG. 7, or other operations for performing the various techniques discussed herein.

In certain aspects, computer-readable medium/memory 935 includes code 925 (e.g., an example means for) for transmitting. In certain aspects, code 925 may include code for transmitting, to a user equipment (UE), a configuration for paging early indication (PEI) occasions for the UE to monitor. In certain aspects, code 925 may include code for transmitting, in at least one of the PEI occasions, a physical downlink control channel (PDCCH) with a PEI that indicates, for multiple paging occasions (POs), whether paging messages are scheduled for the UE in the multiple POs. Code 925 for transmitting may enable the network entity to perform operations 700 illustrated in FIG. 7.

Examples of a computer-readable medium/memory 935 include random access memory (RAM), read-only memory (ROM), solid state memory, a hard drive, a hard disk drive, etc. In some examples, computer-readable medium/memory 935 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In certain aspects, one or more processors 910 include circuitry 915 (e.g., an example means for) for transmitting. In certain aspects, circuitry 915 for transmitting may include circuitry for transmitting, to a UE, a configuration for PEI occasions for the UE to monitor. In certain aspects, circuitry 915 for transmitting may include circuitry for transmitting, in at least one of the PEI occasions, a PDCCH with a PEI that indicates, for multiple paging occasions (POs), whether paging messages are scheduled for the UE in the multiple POs. Circuitry 915 may enable the network entity to perform operations 700 illustrated in FIG. 7.

Various components of communications device 900 may provide means for performing the methods described herein, including with respect to FIG. 7.

In some examples, means for transmitting or sending (or means for outputting for transmission) may include transceivers 232 and/or antenna(s) 234 of BS 102 illustrated in FIG. 2 and/or transceiver 965 and antenna 970 of communications device 900 illustrated in FIG. 9.

In some examples, means for communicating or receiving (or means for obtaining) may include the transceivers 232 and/or antenna(s) 234 of BS 102 illustrated in FIG. 2 and/or transceiver 965 and antenna 970 of communications device 900 illustrated in FIG. 9.

In some examples, means for determining may include various processing system 905 components, such as: the one or more processors 910 in FIG. 9, or aspects of BS 102 depicted in FIG. 2, including receive processor 237, transmit processor 220, TX MIMO processor 230, and/or controller/processor 240.

Notably, FIG. 9 is just one use example, and many other examples and configurations of communications device 900 are possible.

Figure 10:
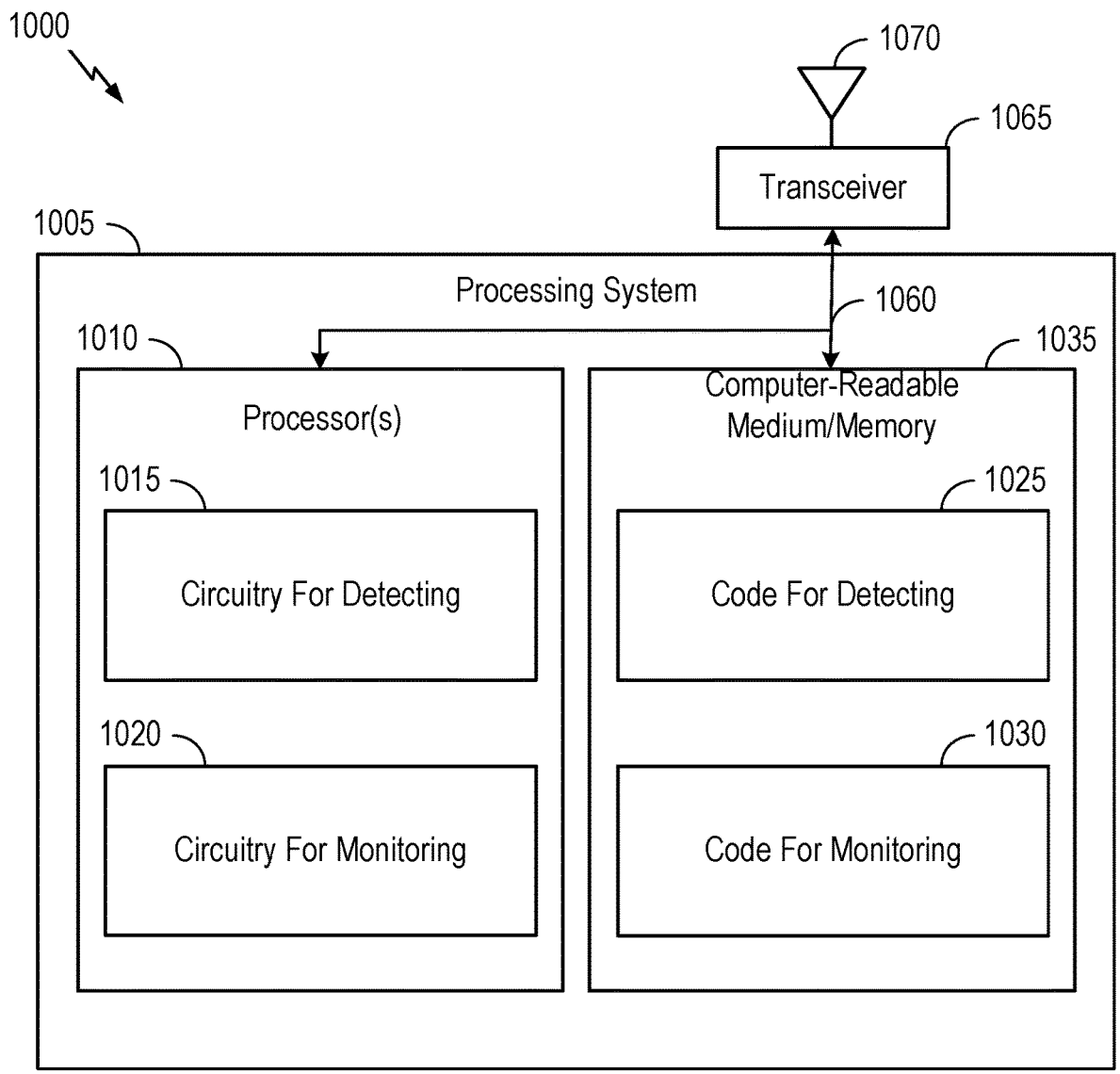
FIG. 10 illustrates a communications device that may include various components configured to perform opera-

FIG. 10 illustrates a communications device 1000 that may include various components (e.g., corresponding to means-plus-function components) operable, configured, or adapted to perform operations for the techniques disclosed herein, such as operations 800 depicted and described with respect to FIG. 8. In some examples, communications device 1000 may be a UE (e.g., UE 104 as described, for example with respect to FIGS. 1 and 2).

Communications device 1000 includes a processing system 1005 coupled to a transceiver 1065 (e.g., a transmitter and/or a receiver). Transceiver 1065 is configured to transmit (or send) and receive signals for communications device 1000 via an antenna 1070, such as the various signals as described herein. Transceiver 1065 may communicate bi-directionally, via antennas 1070, wired, or wireless links as described above. For example, transceiver 1065 may represent a wireless transceiver 1065 and may communicate bi-directionally with another wireless transceiver 1065. Transceiver 1065 may also include or be connected to a modem to modulate the packets and provide the modulated packets to for transmission, and to demodulate received packets. In some examples, transceiver 1065 may be tuned to operate at specified frequencies. For example, a modem can configure transceiver 1065 to operate at a specified frequency and power level based on the communication protocol used by the modem.

Processing system 1005 may be configured to perform processing functions for communications device 1000, including processing signals received and/or to be transmitted by communications device 1000. Processing system 1005 includes one or more processors 1010 coupled to a computer-readable medium/memory 1035 via a bus 1060.

In some examples, one or more processors 1010 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1010 are configured to operate a memory array using a memory controller. In other cases, a memory controller is integrated into the one or more processors 1010. In some cases, the one or more processors 1010 are configured to execute computer-readable instructions stored in a memory to perform various functions. In some aspects, one or more processors 1010 include special purpose components for modem processing, baseband processing, digital signal processing, or transmission processing.

In certain aspects, computer-readable medium/memory 1035 is configured to store instructions (e.g., computer-executable code) that when executed by one or more processors 1010, cause one or more processors 1010 to perform the operations illustrated in FIG. 8, or other operations for performing the various techniques discussed herein.

In certain aspects, computer-readable medium/memory 1035 includes code 1025 (e.g., an example means for) for detecting and code 1030 (e.g., an example means for) for monitoring. In certain aspects, code 1025 for detecting may include code for detecting, in a PEI occasion, a PDCCH from a network entity with a PEI that indicates, for multiple POs, whether paging messages are scheduled for the UE in the multiple POs. In certain aspects, code 1030 for monitoring may include code for monitoring the multiple POs for the paging messages based on the indication in the PEI. Code 1025 and code 1030 may enable the UE to perform operations 800 illustrated in FIG. 8.

Examples of a computer-readable medium/memory 1035 include RAM, ROM, solid state memory, a hard drive, a hard disk drive, etc. In some examples, computer-readable medium/memory 1035 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In certain aspects, one or more processors 1010 include circuitry 1015 (e.g., an example means for) for detecting and circuitry 1020 (e.g., an example means for) for monitoring. In certain aspects, circuitry 1015 for detecting may include circuitry for detecting, in a PEI occasion, a PDCCH from a network entity with a PEI that indicates, for multiple POs, whether paging messages are scheduled for the UE in the multiple POs. In certain aspects, circuitry 1020 may include circuitry for monitoring the multiple POs for the paging messages based on the indication in the PEI. Circuitry 1015 and circuitry 1020 may enable the UE to perform operations 800 illustrated in FIG. 8.

Various components of communications device 1000 may provide means for performing the methods described herein, including with respect to FIG. 8.

In some examples, means for communicating or sending/transmitting (or means for outputting for transmission) may include the transceivers 254 and/or antenna(s) 252 of UE 104 illustrated in FIG. 2 and/or transceiver 1065 and antenna 1070 of communications device 1000 illustrated in in FIG. 10.

In some examples, means for receiving (or means for obtaining) may include the transceivers 254 and/or antenna(s) 252 of UE 104 illustrated in FIG. 2 and/or transceiver 1065 and antenna 1070 of communications device 1000 illustrated in FIG. 10.

In some examples, means for processing or configuring may include various processing system 1005 components, such as: the one or more processors 1010 in FIG. 10, or aspects of UE 104 depicted in FIG. 2, including receive processor 258, transmit processor 264, TX MIMO processor 266, and/or controller/processor 280 (including PEI Monitoring Component 281).

Notably, FIG. 10 is just one use example, and many other examples and configurations of communications device 1000 are possible.

Example Clauses

Implementation examples are described in the following numbered clauses:

Clause 1: A method for wireless communications by a network entity, comprising: transmitting, to a user equipment (UE), a configuration for paging early indication (PEI) occasions for the UE to monitor; and transmitting, in at least one of the PEI occasions, a physical downlink control channel (PDCCH) with a PEI that indicates, for multiple paging occasions (POs), whether paging messages are scheduled for the UE in the multiple POs.

Clause 2: The method of Clause 1, wherein the PDCCH with the PEI is transmitted in a same search space used for sending the paging messages to the UE.

Clause 3: The method of Clause 1 or 2, wherein multiple copies of the PEI are transmitted across multiple PEI occasions.

Clause 4: The method of Clause 3, wherein the multiple copies of the PEI are spaced apart in time by a period corresponding to a number of synchronization signal blocks (SSBs).

Clause 5: The method of any of Clauses 1-4, wherein: the configuration indicates a number of slots corresponding to a minimum gap; and the PEI is transmitted at least the number of slots before a corresponding PO.

Clause 6: The method of any of Clauses 1-5, wherein: the PEI is transmitted in a PDCCH monitoring occasion after an end of a corresponding synchronization signal block (SSB).

Clause 7: The method of any of Clauses 1-6, wherein the configuration indicates at least one of: a first parameter that indicates a number of the multiple POs for which the PEI indicates information; a second parameter that indicates a number of copies of the PEI that the network entity transmits across multiple PEI occasions; a third parameter indicating a number of synchronization signal blocks (SSBs) corresponding to a spacing between copies of the PEI; or a fourth parameter that indicates a number of slots corresponding to a minimum gap between the PEI and a corresponding PO.

Clause 8: The method of Clause 7, wherein at least one of the first parameter, second parameter, third parameter, or fourth parameter varies across cells.

Clause 9: The method of any of Clauses 1-8, wherein: the configuration indicates at least one periodically occurring anchor PO for the UE to monitor regardless of whether the UE receives PEIs prior to the at least one periodically-occurring anchor PO.

Clause 10: The method of any of Clauses 1-9, wherein the PEI notifies UEs of a paging subgroup associated with an upcoming PO have message for those UEs.

Clause 11: The method of any of Clauses 1-10, wherein: the PEI indicates a paging message for the UE; and the network entity transmits scheduling information for a physical downlink shared channel (PDSCH) carrying the paging message via a paging downlink control information (DCI) in a corresponding PO.

Clause 12: The method of any of Clauses 1-11, wherein the PEI notifies the UE of a paging message in the multiple POs that indicates an update to system information or a public warning message.

Clause 13: The method of any of Clauses 1-12, wherein the PEI is transmitted in multiple cells.

Clause 14: A method for wireless communications by a user equipment (UE), comprising: detecting, in a paging early indication (PEI) occasion, a physical downlink control channel (PDCCH) from a network entity with a PEI that indicates, for multiple paging occasions (POs), whether paging messages are scheduled for the UE in the multiple POs; and monitoring the multiple POs for the paging messages based on the indication in the PEI.

Clause 15: The method of Clause 14, wherein the PDCCH with the PEI is detected in a same search space used for sending the paging messages to the UE.

Clause 16: The method of Clause 14 or 15, further comprising: monitoring at least one periodically-occurring anchor PO regardless of whether the UE receives PEIs prior to the at least one periodically-occurring anchor PO.

Clause 17: The method of any of Clauses 14-16, wherein: the PEI notifies UEs of multiple paging subgroups whether one or more upcoming POs have message for those UEs; and the UE monitors the multiple POs for the message based on the PEI indicating a message for a paging subgroup for which the UE belongs.

Clause 18: The method of any of Clauses 14-17, wherein: the PEI indicates a paging message for the UE; and the UE obtains scheduling information for a physical downlink shared channel (PDSCH) carrying the paging message via a paging downlink control information (DCI) in a corresponding Clause PO.

Clause 19: The method of any of Clauses 14-18, further comprising monitoring PEI occasions for PDCCHs with PEIs in a cell regardless of a mobility history of the UE.

Clause 20: The method of any of Clauses 14-19, further comprising receiving, from the network entity, a configuration for PEI occasions for the UE to monitor.

Clause 21: The method of Clause 20, wherein the PEI indicates, for multiple POs, whether messages are scheduled for the UE in those multiple POs.

Clause 22: The method of Clause 20 or 21, wherein the network entity transmits multiple copies of the PEI across multiple PEI occasions.

Clause 23: The method of Clause 22, wherein the multiple copies of the PEI are spaced apart in time by a period corresponding to a number of synchronization signal blocks (SSBs).

Clause 24: The method of any of Clauses 20-23, wherein: the configuration indicates a number of slots corresponding to a minimum gap; and the PEI is transmitted at least the number of slots before a corresponding PO.

Clause 25: The method of any of Clauses 20-24, wherein: the PEI is transmitted in a PDCCH monitoring occasion after an end of a corresponding synchronization signal block (SSB).

Clause 26: The method of any of Clauses 20-25, wherein the configuration indicates at least one of: a first parameter that indicates a number of paging occasions (POs) for which the PEI indicates information; a second parameter that indicates a number of copies of the PEI that the network entity transmits across multiple PEI occasions; a third parameter indicating a number of synchronization signal blocks (SSBs) corresponding to a spacing between copies of the PEI; or a fourth parameter that indicates a number of slots corresponding to a minimum gap between the PEI and a corresponding PO.

Clause 27: A processing system, comprising: a memory comprising computer-executable instructions; one or more processors configured to execute the computer-executable instructions and cause the processing system to perform a method in accordance with any one of Clauses 1-26.

Clause 28: A processing system, comprising means for performing a method in accordance with any one of Clauses 1-26.

Clause 29: A non-transitory computer-readable medium comprising computer-executable instructions that, when executed by one or more processors of a processing system, cause the processing system to perform a method in accordance with any one of Clauses 1-26.

Clause 30: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communications system 100.

In $3^{rd}$ Generation Partnership Project (3GPP), the term "cell" can refer to a coverage area of a NodeB and/or a narrowband subsystem serving this coverage area, depending on the context in which the term is used. In NR systems, the term "cell" and base station (BS), next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by user equipments (UEs) with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the Evolved Packet Core (EPC) 160 through first backhaul links 132 (e.g., an S1 interface). BSs 102 configured for 5G (e.g., 5G NR or Next Generation RAN (NG-RAN)) may interface with 5G Core (5GC) 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 gigahertz (GHz) unlicensed frequency spectrum as used by the Wi-Fi AP 150. Small cell 102', employing NR in an unlicensed frequency spectrum, may boost coverage to and/or increase capacity of the access network.

Some BSs 102, such as BS 180 (e.g., gNB) may operate in a traditional sub-6 GHz spectrum, in millimeter wave (mmWave) frequencies, and/or near mmWave frequencies in communication with the UE 104. When BS 180 operates in mmWave or near mmWave frequencies, BS 180 may be referred to as an mmWave BS.

The communication links 120 between BSs 102 and, for example, UEs 104, may be through one or more carriers. For example, BSs 102 and UEs 104 may use spectrum up to Y megahertz (MHz) (e.g., 5, 10, 15, 20, 100, 400, and other MHz) bandwidth per carrier allocated in a carrier aggregation of up to a total of Yx MHz (x component carriers (CCs)) used for transmission in each direction. The carriers may or may not be adjacent to each other. Allocation of carriers may be asymmetric with respect to downlink (DL) and uplink (UL) (e.g., more or fewer carriers may be allocated for DL than for UL). The CCs may include a primary CC and one or more secondary CCs. A primary CC may be referred to as a primary cell (PCell) and a secondary CC may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to BSs 102 belonging to a Multicast Broadcast Single Frequency Network (MB SFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides Quality of Service (QoS) flow and session management.

All user IP packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., in wireless communications system 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM)) to obtain an output sample stream. Each modulator may further process (e.g., convert to analog, amplify, filter, and upconvert) the output sample stream to obtain a downlink signal. DL signals from the modulators in transceivers 232a-232t may be transmitted via the antennas 234a-234t, respectively.

At UE 104, antennas 252a-252r may receive the DL signals from BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the UL, at UE 104, transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single-carrier frequency division multiplexing (SC-FDM)), and transmitted to BS 102.

At BS 102, the UL signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively. Scheduler 244 may schedule UEs for data transmission on the DL and/or UL.

5G may utilize OFDM with a cyclic prefix (CP) on the uplink and downlink. 5G may also support half-duplex operation using time division duplexing (TDD). OFDM and SC-FDM partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, and others).

As above, FIGS. 3A-3D depict various example aspects of data structures for a wireless communication system, such as wireless communications system 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be TDD, in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 milliseconds (ms)) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be CP-OFDM symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The SCS and symbol length/duration are a function of the numerology. The SCS may be equal to $2^\mu \times 15$ kHz, where $\mu$ is the numerology 0 to 5. As such, the numerology $\mu=0$ has an SCS of 15 kHz and the numerology $\mu=5$ has an SCS of 480 kHz. The symbol length/duration is inversely related to the SCS. FIGS. 3A-3D provide an example of slot configuration 0 with 14 symbols per slot and numerology $\mu=2$ with 4 slots per subframe. The slot duration is 0.25 ms, the SCS is 60 kHz, and the symbol duration is approximately 16.67 µs.

A resource grid may be used to represent the frame structure. Each time slot includes an RB (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as RX for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The PDCCH carries downlink control information (DCI) within one or more control channel elements (CCEs), each CCE including nine RE groups (REGs), each REG including four consecutive REs in an OFDM symbol.

A PSS may be within symbol 2 of particular subframes of a frame. The PSS is used by a UE (e.g., UE 104 of FIGS. 1 and 2) to determine subframe/symbol timing and a physical layer identity.

An SSS may be within symbol 4 of particular subframes of a frame. The SSS is used by a UE (e.g., UE 104 of FIGS. 1 and 2) to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The PBCH, which carries a master information block (MIB), may be logically grouped with the PSS and SSS to form a synchronization signal (SS)/PBCH block. The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the PUCCH and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit SRSs. The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgement (ACK)/negative ACK (NACK) feedback. The PUSCH carries data, and may additionally be used to carry a buffer status report (BSR), a power headroom report (PHR), and/or UCI.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications by a network entity, comprising:
   a memory; and
   one or more processors coupled to the memory, the memory and the one or more processors being configured to:
      transmit, to a user equipment (UE), a configuration for paging early indication (PEI) occasions for the UE to monitor; and
      transmit, to the UE, in at least one of the PEI occasions, a physical downlink control channel (PDCCH) with a PEI that indicates, for multiple paging occasions (POs), whether paging messages are scheduled for the UE in the multiple POs, wherein the PDCCH with the PEI is transmitted in a cell regardless of a mobility history of the UE in the cell.

2. The apparatus of claim 1, wherein the PDCCH with the PEI is transmitted in a same search space used for sending the paging messages to the UE.

3. The apparatus of claim 1, wherein:
   the configuration indicates a number of slots corresponding to a minimum gap; and
   the PEI is transmitted at least the number of slots before a corresponding PO.

4. The apparatus of claim 1, wherein the configuration configures the UE not to monitor a PO when the UE does not detect a PEI in an associated PEI occasion of the PEI occasions.

5. The apparatus of claim 1, wherein:
   the configuration indicates at least one periodically-occurring anchor PO for the UE to monitor regardless of whether the UE receives PEIs prior to the at least one periodically-occurring anchor PO.

6. The apparatus of claim 1, wherein when the PEI indicates a paging message is scheduled for the UE, the memory and the one or more processors are further configured to:
   transmit scheduling information for a physical downlink shared channel (PDSCH) carrying the paging message via a paging downlink control information (DCI) in a corresponding PO.

7. The apparatus of claim 1, wherein multiple copies of the PEI are transmitted across multiple PEI occasions.

8. The apparatus of claim 7, wherein the multiple copies of the PEI are spaced apart in time by a period corresponding to a number of synchronization signal blocks (SSBs).

9. The apparatus of claim 1, wherein:
   the PEI is transmitted in a PDCCH monitoring occasion after an end of a corresponding synchronization signal block (SSB).

10. The apparatus of claim 1, wherein the configuration indicates at least one of:
    a first parameter that indicates a number of the multiple POs for which the PEI indicates information;
    a second parameter that indicates a number of copies of the PEI that the network entity transmits across multiple PEI occasions;
    a third parameter indicating a number of synchronization signal blocks (SSBs) corresponding to a spacing between copies of the PEI; or
    a fourth parameter that indicates a number of slots corresponding to a minimum gap between the PEI and a corresponding PO.

11. The apparatus of claim 10, wherein at least one of the first parameter, the second parameter, the third parameter, or the fourth parameter varies across cells.

12. The apparatus of claim 1, wherein:
    the UE is one of multiple UEs of a paging subgroup; and
    the PEI indicates whether paging messages are scheduled for the multiple UEs of the paging subgroup in the multiple POs.

13. The apparatus of claim 1, wherein the PEI notifies the UE of a paging message in the multiple POs that indicates an update to system information or a public warning message.

14. The apparatus of claim 1, wherein the memory and the one or more processors are configured to transmit the PEI to the UE in multiple cells.

15. An apparatus for wireless communications by a user equipment (UE), comprising:
    a memory; and
    one or more processors coupled to the memory, the memory and the one or more processors being configured to:
       monitor paging early indication (PEI) occasions for physical downlink control channels (PDCCHs) with PEIs in a cell regardless of a mobility history of the UE;
       detect, in a PEI occasion, a PDCCH with a PEI that indicates, for multiple paging occasions (POs), whether to monitor paging messages in the multiple POs; and
       monitor the multiple POs for the paging messages based on the PEI.

16. The apparatus of claim 15, wherein the UE monitors the PDCCH with the PEI in a same search space as the paging messages.

17. The apparatus of claim 15, wherein the memory and the one or more processors are further configured to:
monitor at least one periodically-occurring anchor PO regardless of whether the UE receives PEIs prior to the at least one periodically-occurring anchor PO.

18. The apparatus of claim 15, wherein:
the UE is one of multiple UEs of a paging subgroup;
the PEI indicates the paging subgroup; and
the memory and the one or more processors are configured to monitor the multiple POs based on the PEI indicating the paging subgroup.

19. The apparatus of claim 18, wherein the memory and the one or more processors are configured to:
monitor the multiple POs for paging downlink control information (DCI) scheduling a paging message.

20. The apparatus of claim 15, wherein the memory and the one or more processors are further configured to receive a configuration for the PEI occasions.

21. The apparatus of claim 20, wherein multiple copies of the PEI are transmitted across multiple PEI occasions, including the PEI occasion.

22. The apparatus of claim 21, wherein the multiple copies of the PEI are spaced apart in time by a period corresponding to a number of synchronization signal blocks (SSBs).

23. The apparatus of claim 20, wherein:
the configuration indicates a number of slots corresponding to a minimum gap; and
the PEI is transmitted at least the number of slots before a corresponding PO.

24. The apparatus of claim 18, wherein the memory and the one or more processors are configured not to monitor a PO when the UE does not detect a PEI in an associated PEI occasion.

25. The apparatus of claim 20, wherein:
the PEI is transmitted in a PDCCH monitoring occasion after an end of a corresponding synchronization signal block (SSB).

26. The apparatus of claim 20, wherein the configuration indicates at least one of:
a first parameter that indicates a number of paging occasions (POs) for which the PEI indicates information;
a second parameter that indicates a number of copies of the PEI across multiple PEI occasions;
a third parameter indicating a number of synchronization signal blocks (SSBs) corresponding to a spacing between the copies of the PEI; or
a fourth parameter that indicates a number of slots corresponding to a minimum gap between the PEI and a corresponding PO.

27. A method for wireless communications by a network entity, comprising:
transmitting, to a user equipment (UE), a configuration for paging early indication (PEI) occasions for the UE to monitor; and
transmitting, to the UE, in at least one of the PEI occasions, a physical downlink control channel (PDCCH) with a PEI that indicates, for multiple paging occasions (POs), whether paging messages are scheduled for the UE in the multiple POs, wherein the PDCCH with the PEI is transmitted in a cell regardless of a mobility history of the UE in the cell.

28. A method for wireless communications by a user equipment (UE), comprising:
monitoring paging early indication (PEI) occasions for physical downlink control channels (PDCCHs) with PEIs in a cell regardless of a mobility history of the UE;
detecting, in a PEI occasion, a PDCCH with a PEI that indicates, for multiple paging occasions (POs), whether to monitor paging messages in the multiple POs; and
monitoring the multiple POs for paging messages based on the PEI.

* * * * *